United States Patent
Fukano

(10) Patent No.: US 11,946,116 B2
(45) Date of Patent: Apr. 2, 2024

(54) METHOD FOR RECOVERING CU AND METHOD OF PREPARING ELECTROLYTIC COPPER

(71) Applicant: JX METALS CORPORATION, Tokyo (JP)

(72) Inventor: Yuken Fukano, Hitachi (JP)

(73) Assignee: JX METALS CORPORATION, Tokyo (JP)

( * ) Notice: Subject to any disclaimer, the term of this patent is extended or adjusted under 35 U.S.C. 154(b) by 334 days.

(21) Appl. No.: 16/640,814

(22) PCT Filed: Dec. 27, 2018

(86) PCT No.: PCT/JP2018/048383
§ 371 (c)(1),
(2) Date: Feb. 21, 2020

(87) PCT Pub. No.: WO2019/131977
PCT Pub. Date: Jul. 4, 2019

(65) Prior Publication Data
US 2021/0032722 A1   Feb. 4, 2021

(30) Foreign Application Priority Data
Dec. 27, 2017   (JP) ................................ 2017-252011

(51) Int. Cl.
*C22B 15/00*   (2006.01)
(52) U.S. Cl.
CPC ...... *C22B 15/0069* (2013.01); *C22B 15/0028* (2013.01); *C22B 15/0086* (2013.01)

(58) Field of Classification Search
CPC .. C22B 3/00; C22B 3/04; C22B 3/045; C22B 3/06; C22B 3/065; C22B 3/08;
(Continued)

(56) References Cited

U.S. PATENT DOCUMENTS 3,476,552 A * 11/1969 Baker .................... C01G 13/00
                                                        75/431
6,838,504 B1 * 1/2005 Webster ................ H01M 10/54
                                                        524/436
(Continued)

FOREIGN PATENT DOCUMENTS

EP    0319740 A1 *  6/1989 ............. C02F 1/722
JP    2011-42858 A   3/2011
(Continued)

OTHER PUBLICATIONS

Michael O. Schwartz, Mercury in Zinc Deposits, 1997, International Geology Review, vol. 905-923 (Year: 1997).*
(Continued)

*Primary Examiner* — Vanessa T. Luk
*Assistant Examiner* — Nikolas Takuya Pullen
(74) *Attorney, Agent, or Firm* — Birch, Stewart, Kolasch & Birch, LLP

(57) ABSTRACT

Providing a method of recovering Cu from copper ore containing Hg. A method for recovering Cu from copper ore, the method comprising: (A) providing copper ore containing Hg with an amount of 0.2 ppm or more; (B) treating the copper ore to leach Cu and Hg with use of solution containing iodide ions and Fe (3+); and (C) treating post-leaching solution with activated carbon to absorb the iodide ions and Hg.

2 Claims, 2 Drawing Sheets

(58) Field of Classification Search
CPC .... C22B 3/10; C22B 3/12; C22B 3/14; C22B 3/18; C22B 3/20; C22B 3/205; C22B 3/22; C22B 3/24; C22B 3/44; C22B 3/46; C22B 15/00; C22B 15/0028; C22B 15/0063; C22B 15/0065; C22B 15/0067; C22B 15/0069; C22B 15/008; C22B 15/0086; C22B 15/0089; C22B 43/00; C22B 15/0071; Y02P 10/20
See application file for complete search history.

(56) References Cited

U.S. PATENT DOCUMENTS

| 2010/0018349 | A1* | 1/2010 | Manabe | ............. | C22B 15/0071 |
|---|---|---|---|---|---|
| | | | | | 75/743 |
| 2011/0041654 | A1 | 2/2011 | Manabe | | |
| 2011/0229385 | A1 | 9/2011 | Kuwano et al. | | |
| 2013/0058846 | A1 | 3/2013 | Kuwano et al. | | |
| 2018/0187287 | A1 | 7/2018 | Sato et al. | | |

FOREIGN PATENT DOCUMENTS

| JP | 2011-190520 A | 9/2011 |
|---|---|---|
| JP | 2013-1634 A | 1/2013 |
| JP | 5711225 B2 | 4/2015 |
| JP | 2017-53018 A | 3/2017 |
| WO | WO 2017/043668 A1 | 3/2017 |

OTHER PUBLICATIONS

Reynier N, Lastra R, Laviolette C, Fiset J-F, Bouzoubaâ N, Chapman M. Uranium, Cesium, and Mercury Leaching and Recovery from Cemented Radioactive Wastes in Sulfuric Acid and Iodide Media. Minerals. Nov. 20, 2015; 5(4):744-757. (Year: 2015).*

Japanese Notice of Reasons for Refusal for corresponding Japanese Application No. 2017-252011, dated Jun. 22, 2021, with an English translation.

Yoshimoto et al., "Research on the future prediction of the amount of mercury recovered from non-ferrous refining," Twenty Second Waste Resource Circulation Research Proceedings, vol. 22, 2011, 4 pages total.

Correia et al., "The leaching of tetrahedrite in ferric chloride solutions", Hydrometallurgy, 2000, vol. 57, pp. 167-179.

International Search Report, issued in PCT/JP2018/048383, dated Mar. 1, 2019.

Marsh et al., "Activated Carbon", Elsevier, Dec. 29, 2006, total 555 pages.

Salomon-De-Friedberg et al., "Tackling Impurities in Copper Concentrates", ALTA Conference Proceedings 2015, May 30, 2015, total 10 pages.

International Preliminary Report on Patentability and the Written Opinion of the International Searching Authority (Forms PCT/IB/326, PCT/IB/373, and PCT/ISA/237) for International Application No. PCT/JP2018/048383, dated Jul. 9, 2020.

* cited by examiner

[Fig. 1]
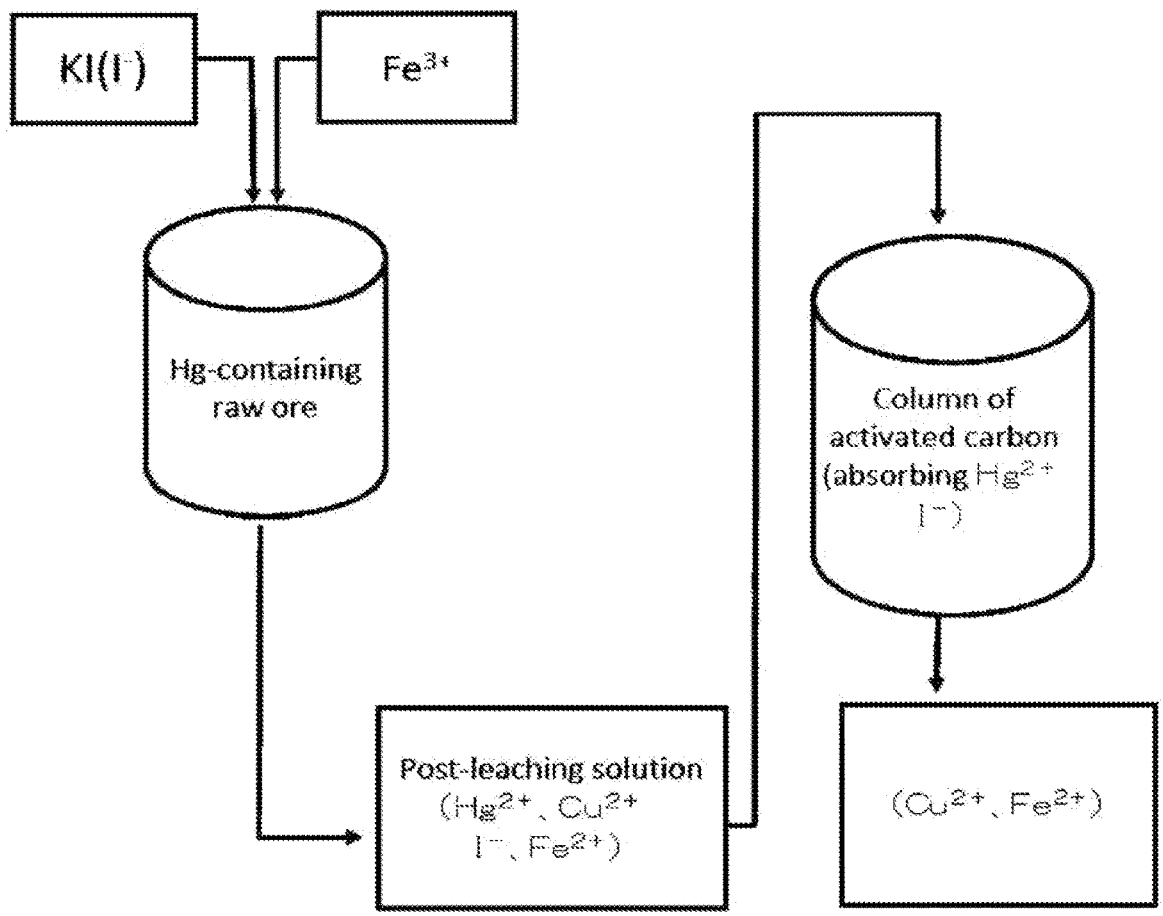
[Fig. 2]
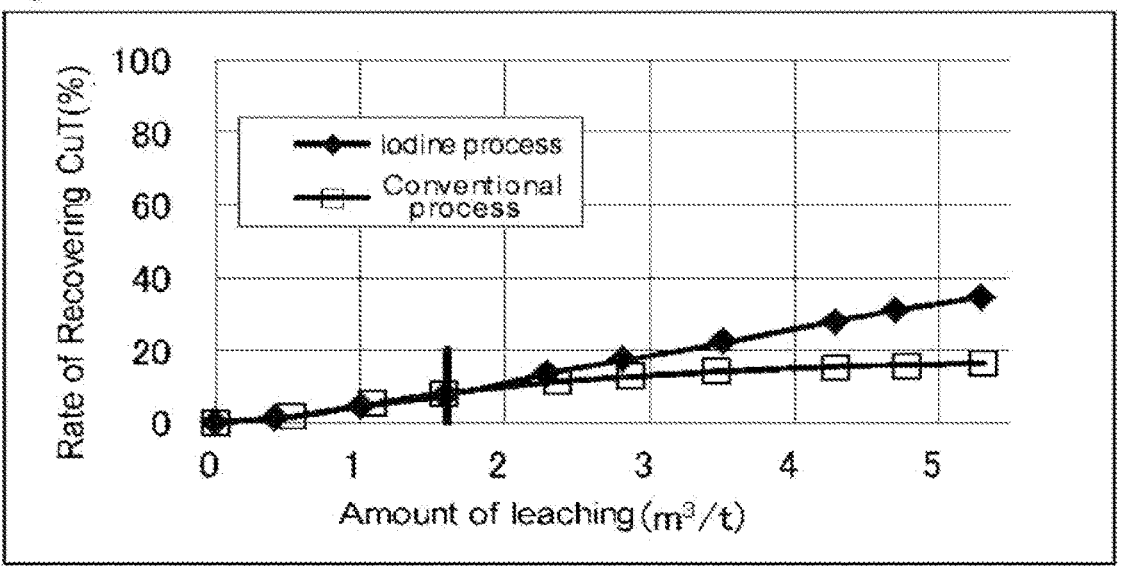

[Fig. 3]
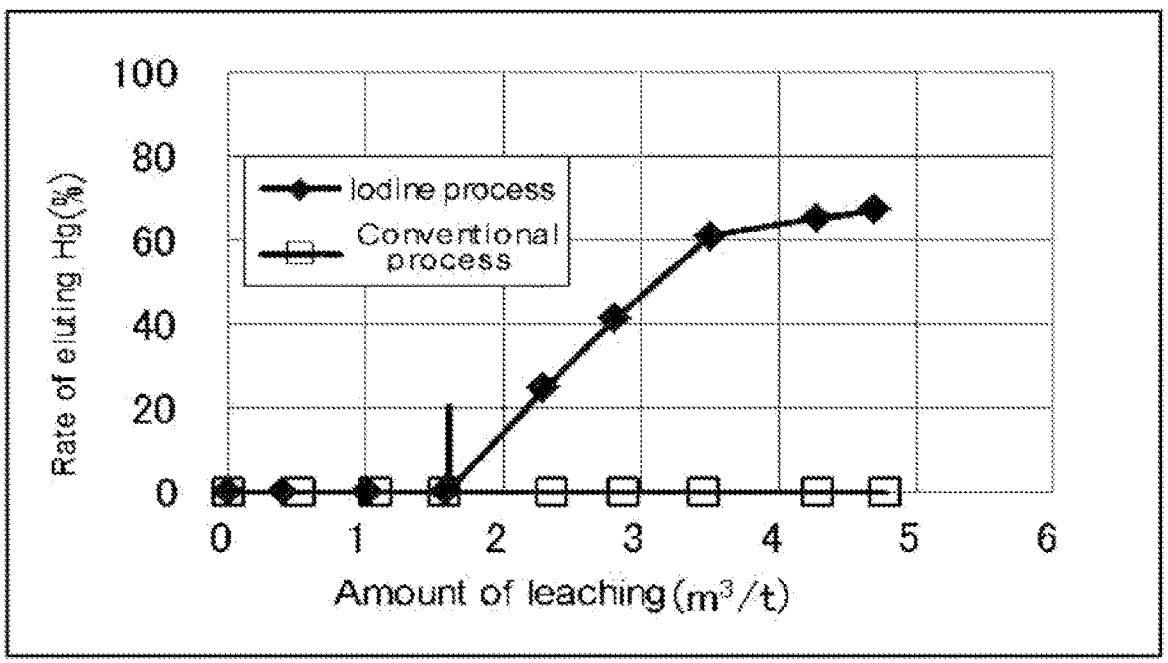
[Fig. 4]
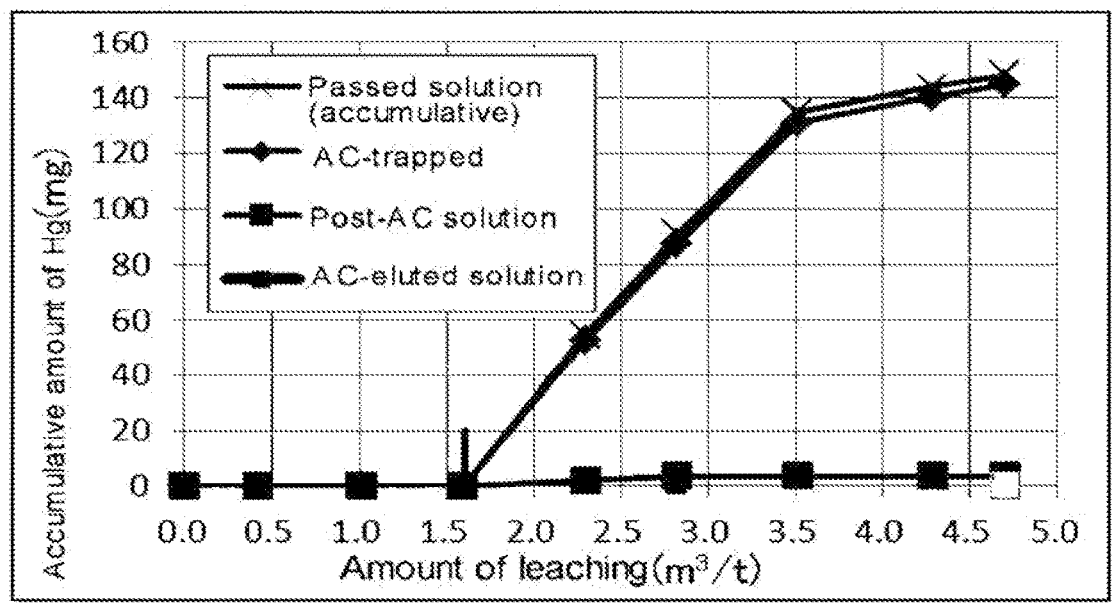

METHOD FOR RECOVERING CU AND METHOD OF PREPARING ELECTROLYTIC COPPER

TECHNICAL FIELD

The present invention is related to a method for recovering Cu and a method of preparing electrolytic copper. In particular, the present invention is related to a method for recovering Cu by leaching Cu from copper ore, and a method of preparing electrolytic copper using the same.

BACKGROUND ART

In general, type of leaching copper sulfide by hydrometallurgical process known in the art includes:
- a form of leaching by a batch stirring reaction using sulfuric acid or hydrochloric acid
- a form of leaching by preparing a laminate of ore, providing sulfuric acid or hydrochloric acid to the top of the laminate and recovering the liquid dropped by gravity (heap leaching method)
- a form of leaching by utilizing the ability of microbes such as iron oxidizing microbes for leaching the copper efficiently and recovering it (bioleaching)

However, primary copper sulfide ore such as chalcopyrite is extremely hard to be solved into inorganic acid. Thus, if utilizing a bioleaching method to leach under room temperature, a rate of leaching is significantly low. Japanese Unexamined Patent Application Publication No 2011-42858 (Patent Document 1) reports that in the co-presence of iodide ions and Fe (III) ions as oxidant, leaching of copper sulfide ore mainly containing chalcopyrite and enargite is promoted under room temperature.

In this regard, Japanese Patent No. 5711225 (Patent Document 2) discloses a method of: regenerating Fe (II) ions, which is generated after leaching, in the presence of iodide ions by iron-oxidizing microbes; and absorbing the iodide ions into activated carbon.

Japanese Unexamined Patent Application Publication No 2011-190520 (Patent Document 3) discloses that, after decreasing iodine to the concentration of less than 1 mg/L, Fe(II) ions in the solution, or newly added Fe(II) ions is oxidized to Fe(III) ions by iron-oxidizing microbes.

Japanese Unexamined Patent Application Publication No 2013-001634 (Patent Document 4) discloses a method of eluting iodine that has been absorbed into activated carbon.

CITATION LIST

Patent Literature

PTL 1: Japanese Unexamined Patent Application Publication No 2011-42858
PTL 2: Japanese Patent No. 5711225
PTL 3: Japanese Unexamined Patent Application Publication No 2011-190520
PTL 4: Japanese Unexamined Patent Application Publication No 2013-001634

SUMMARY OF INVENTION

Technical Problem

Subject of leaching copper is ore that is produced from mine, which is, in fact, a mixture of various types of ore. Each amount of chemical element contained in such a mixture varies from place to place.

Above all, ore containing Hg is not preferable for leaching copper. This is because Hg is hazardous for human body and environment. Further, in the case of pyrometallurgical processes, if Hg concentration is high, it is hard to treat the ore concentrate, and Hg is hard to be isolated from ore concentrate by beneficiation processes. Meanwhile, in the case of use of conventional hydrometallurgical processes instead of pyrometallurgical ones, it is hard to leach copper economically due to low speed of leaching Cu from primary copper sulfide ore. For these reasons, there have not been any examples of leaching copper ore containing Hg in an industrial scale.

The inventors newly discovered that if leaching copper from ore containing Hg by using solution containing iodide ions and Fe (III) ions, Hg is also leached together.

An object of the present invention is to address a new problem that is based on the above new discovery. In other words, an object of the present invention is to provide a method of decreasing an amount of Hg in post-leaching solution containing Cu.

Solution to Problem

As a result of intensive studies, the present inventors discovered that Hg can be recovered by activated carbon. In other words, if post-leaching solution is treated by activated carbon, Cu is kept in the post-leaching solution while most of Hg is absorbed into activated carbon. Thereby, contamination of Hg can be prevented in the process of smelting Cu.

On the basis of the above discovery, the present invention in one aspect includes the following inventions:

<Invention 1>
A method for recovering Cu from copper ore, the method comprising:
(A) providing copper ore containing Hg with an amount of 0.2 ppm or more;
(B) treating the copper ore to leach Cu and Hg with use of solution containing iodide ions and Fe (3+); and
(C) treating post-leaching solution with activated carbon to absorb the iodide ions and Hg.

<Invention 2>
The method of Invention 1, further comprising treating the activated carbon with sulfurous acid and/or salt thereof.

<Invention 3>
The method of Invention 2, further comprising reusing the activated carbon that has been treated with sulfurous acid and/or salt thereof for the step (C).

<Invention 4>
A method of preparing electrolytic copper comprising:
obtaining post-leaching solution containing Cu according to any one of the methods of Inventions 1-3; and
smelting electrolytic copper from the post leaching solution.

Advantageous Effect of Invention

In one aspect of the present invention, after leaching Cu and Hg from copper ore containing a certain amount of Hg, post-leaching solution is treated with activated carbon. Thereby, it is possible to decrease an amount of Hg in the post-leaching solution containing Cu.

BRIEF DESCRIPTION OF DRAWINGS

FIG. 1 shows outline of Cu smelting in a method of one embodiment of the present invention.

FIG. 2 shows an amount of leaching Cu in a method of one embodiment of the present invention.

FIG. 3 shows an amount of leaching Hg in a method of one embodiment of the present invention.

FIG. 4 shows an amount of absorbing Hg into activated carbon and eluting Hg from activated carbon in a method of one embodiment of the present invention.

DESCRIPTION OF EMBODIMENTS

Now, explanatory embodiments according to the invention are described. The descriptions hereinafter are aiming for promoting understanding of the invention. In other words, the descriptions hereinafter are not intended to limit the scope of the present invention.

1. Summary

In one embodiment, the present invention includes a method for recovering Cu from copper ore. The method may include at least the following steps:

(A) providing copper ore containing Hg with an amount of 0.2 ppm or more;

(B) treating the copper ore to leach Cu and Hg with use of solution containing iodide ions and Fe (3+); and (C) treating post-leaching solution with activated carbon to absorb the iodide ions and Hg.

FIG. 1 shows a more specified embodiment. A specified example of the above step (B) includes heap leaching of low-amount sulfide ore. As shown in FIG. 1, iodide ions and Fe (3+) are provided from top of laminate of copper ore. As a specified example of the above step (C), column for absorbing and eluting iodine via activated carbon is provided, and post-leaching solution is passed through the column.

Each of these steps is described in detail hereinbelow.

2. Subject Ore

In one embodiment, a method of the present invention includes providing copper ore containing Hg with certain amount. Though not particularly limited, the copper ore may be copper oxide ore, secondary copper sulfide ore, primary copper sulfide ore etc., more preferably may be primary copper sulfide ore. In general, although speed of leaching by other method for primary copper sulfide is slow, speed of leaching by solution containing iodide ions and Fe (3+) is sufficient. For this reason, it is more advantageous to use solution containing iodide ions and Fe (3+).

Though not particularly limited, an amount of Hg contained in the copper ore is 0.2 ppm or more, preferably 1 ppm or more, more preferably 10 ppm or more. Copper ore is often contaminated with Hg ore (such as Cinnabar, Livingstonite), and thus, copper ore containing Hg is unpreferable for smelting Cu. Further, in the case of smelting, if copper ore concentrate contains 10 ppm or more of Hg, it costs penalty to be paid to the smelters. Hg is concentrated by approximately 50 times via a process such as froth floatation, which means that if concentration of Hg in copper ore concentrate after froth floatation is 10 ppm, concentration prior to froth floatation is approximately 0.2 ppm. Thus, it would be significantly beneficial if Hg contamination can be decreased in copper ore containing 0.2 ppm or more of Hg, and smelting can be performed. Though not particularly limited, the upper limit for density of Hg is typically 100 ppm or less.

3. Process of Leaching

From copper ore as stated above, Cu can be leached via solution containing iodide ions and Fe (3+). In the process of leaching, not only Cu, but also Hg is leached. A method of leaching Cu from copper ore by solution containing iodide ions and Fe (3+) includes the following methods (Iodine process) in one embodiment.

A "leaching method using Iodine process" described herein includes either of the following leaching methods A-C, or combination thereof.

<Leaching Method A Using Iodine Process>

(a method of leaching copper from ore by using leaching solution containing Iodide ions and Fe (III) ions)

Although it is not intended to limit the scope of the present invention by the following explanation, for example, a reaction for the above described leaching proceeds according to a series of catalytic reactions as shown in the following (Formula 1) and (Formula 2).

$$2I^- + 2Fe^{3+} \rightleftharpoons I_2 + 2Fe^{2+} \quad \text{(Formula 1)}$$

$$CuFeS_2 + I_2 + 2Fe^{3+} \rightleftharpoons Cu^{2+} + 3Fe^{2+} + 2S + 2I^- \quad \text{(Formula 2)}$$

Via this catalytic reaction by Iodine, copper can be efficiently leached from copper sulfide ore.

Incidentally, since Iodine has poor solubility to water, it is added in the form of Iodide to leaching solution, which is easily solved in leaching solution and is easily ionized into Iodide ions. Iodide may be compounds that are soluble in water and generate Iodide ions. For example, it may include Sodium Iodide, Potassium Iodide, Ammonium Iodide, Hydrogen Iodide etc.

The leaching method may utilize an embodiment of leaching such as hydrometallurgical processes of copper that uses sulfuric acid solution as leaching solution. In other words, sulfuric acid solution may be added with Iodide ions and Fe (III) ions to be used for leaching copper from ore. Furthermore, for example, not only batch-stirring leaching, but also heap leaching or dump leaching may be used, both of which rely on the mechanism in which sulfuric acid is scattered on piles of ore and copper is leached into the scattered sulfuric acid. Furthermore, as a method according to a method of leaching from stacked ore, in-place leaching may be used, in which leaching solution flows into underground ore deposit.

Furthermore, Iodine may be recovered from post-leaching solution, for example, by: using anion-exchange resin; oxidizing by oxidant and then blowing out; or solvent-extraction. The recovered Iodine may be recycled in the form of solution containing a certain type of Iodide as described above or other forms of Iodine.

In the leaching method, temperature for leaching is not limited to, but it does not need any heating in particular, and thus temperature may be ambient temperature.

Further, total concentration of Iodine in leaching solution may be appropriately set according to reaction, types, shape, and/or copper grade of copper sulfide ore of interest. Preferably the concentration may be 100 mg/L-300 mg/L as disclosed in Japanese patent No 4565025, or 8 mg/L-100 mg/L as disclosed in Japanese patent No 4950257.

Moreover, a ratio of concentration for Fe (III) ions to total concentration for Iodine in leaching solution may be preferably, for example, 20 times or more in weight ratio (e.g., if the concentration of Iodide ions is 100 mg/L, then the concentration of Fe (III) ions is 2 g/L or more). Although not limited to, the source of Fe (III) ions may be Iron (III) sulfate, the Iron (III) oxidized from Fe (II) ion in Iron (II) chloride or Iron (II) sulfate solution. Alternatively, acid solution containing Fe (III) ions that is obtained via Iron-oxidizing process described hereinafter may be preferably used. The pH for Leaching solution may be adjusted to 2.5 or less by sulfuric acid etc. for the purpose of avoiding from Fe ions' precipitation.

<Leaching Method B Using Iodine Process>

(A method for leaching copper, including: using sulfuric acid solution containing Fe(III) ions as leaching solution to leach copper from ore; and further leaching copper from the ore by subjecting its residue to solution containing Iodide ions and Fe (III) ions)

The above method for leaching includes a first leaching step and a second leaching step. The first leaching step relies on reaction of oxidizing copper by solution not containing Iodine but containing Fe (III) ions (for example, ferric leaching, or bacteria leaching). Following this, the second leaching step relies on leaching by solution containing Iodide ions and Fe (III) ions.

Conditions in the second leaching step, such as a total concentration of Iodine, ratio of Fe (III) ions to the total concentration of Iodine, pH and temperature may be the same as those described in the above section of "<Leaching method A using Iodine process>".

Via the first leaching step in which reaction of oxidizing copper and leaching copper (such as ferric leaching, or bacteria leaching) proceeds by solution not containing Iodine, copper is leached into solution from copper oxide ore and secondary copper sulfide ore both of which co-exists in the solution. Since Iodine is not used in this first leaching step, Iodine will not be lost via the first step.

Further, ore is initially subjected to leaching via oxidation by Fe (III) ions in advance, by which Cu in copper oxide ore and secondary copper sulfide ore are relatively easy to be dissolved, and then ore is subjected to leaching by Iodine for the purpose of dissolving Cu in primary copper sulfide ore, which is hard to be dissolved. Thereby, loss of Iodine by evaporation can be decreased, and loss of Iodine by reacting Iodide ions with $Cu^{2+}$ in Formula 2 to generate insoluble CuI can be decreased.

Incidentally, it is preferable in the first leaching step, that leaching secondary copper sulfide ore in copper ore continues until the rate of leaching reaches to 80% or more, in view of decreasing a concentration of copper in leaching solution such that Iodide ions and copper do not generate precipitation. Furthermore, it is preferable in the first leaching step, that copper sulfide ore is subjected to leaching with the ratio of 1 t of ore to 1-3 $m^3$ of leaching solution to be scattered, in view of setting an appropriate time for the first leaching step.

Moreover, for the purpose of not being too slow speed of leaching in the first leaching step, a concentration of Fe (III) ions in leaching solution is preferably 2 g/L or more. In view of recycling, practical range for the concentration is preferably 5 g/L or less.

<Leaching Method C Using Iodine Process>

The leaching methods A and B as described above may be modified such that solution of leaching further contains sulfuric acid. Using this method of leaching, it is possible to obtain a result that corresponds well to an estimated amount of leaching obtained by the above described method of analysis.

4. Process of Treating for Post-Leaching Solution

After the above process of leaching, post-leaching solution may be recovered. For example, via solid-liquid separation, residue of leaching and post-leaching solution can be separated. After that, post-leaching solution may be treated with activated carbon. Thereby, iodide ions and Hg, which are contained in post-leaching solution, can be absorbed into activated carbon.

Type or material for activated carbon used in the present invention is not particularly limited. However, activated carbon preferably has large surface area, and is suitable for use in liquid phase, and, is good in stability. Further, shape of activated carbon is preferably granular or spherical. For example, Coconut Shell Mc (Taihei Chemical Industrial Co. Ltd.) and SHIRASAGI X7000H (Japan Enviro Chemicals) may be used. Further, an amount of activated carbon is preferably ten times or more relative to weight of iodine in solution, more preferably, 13 times or more. Regarding to a method of treating by activated carbon, the activated carbon may be introduced into tank of post-leaching solution, and may be agitated. Alternatively, column of activated carbon may be prepared and post-leaching solution may be passed through the column.

5. Other Steps 5-1. Elution of Iodide Ions from Activated Carbon

In one embodiment, the present invention includes treating, with sulfurous acid and/or salt thereof, activated carbon that Hg and iodide ions have been absorbed into. Thereby, among Hg and iodide ions that have been absorbed into activated carbon, iodide ions can be eluted from activated carbon. Although an amount of sulfurous acid and/or salt thereof is not particularly limited, typically, iodide ions may be recovered via solution containing sulfurous acid ions and/or salt thereof with weight ratio of 0.1-10 relative to iodide ions to be eluted.

5-2. Recycling of Iodide Ions, Iron Ions and/or Activate Carbon

After eluting iodide ions according to the above method, iodide ions may be recovered to reuse for the leaching process as stated above. Also, Fe (II) ions, which are contained with a large amount in post-leaching solution, may be regenerated into Fe (III) ions by iron-oxidizing microbes etc. Then, the regenerated Fe (III) ions may be reused in the process of leaching as stated above.

Furthermore, activated carbon that iodide ions have been eluted from may be also reused for absorbing iodide ions and Hg in post-leaching solution. An amount of iodide ions that are absorbed into activated carbon is significantly more than that of Hg. Therefore, after eluting iodide ions, the ability of absorbing is sufficiently recovered and thus activated carbon is reusable.

Of course, if repeating reuse of activated carbon, accumulation of Hg will increase and the ability of absorbing will decrease in due course. Especially, in case where ore containing a large amount of Hg is treated, accumulation of Hg into activated carbon may be saturated. Thus, in such a case, fresh activated carbon may be introduced. Further, activated carbon in which a sufficient amount of Hg has been absorbed may be recovered as it is and then subjected to a process of disposing Hg. As a process of disposing Hg, activated carbon may be burned to produce gas or dust that Hg is recovered from, or may be treated with NaOH solution to remove Hg from activated carbon.

5-3. A method of Preparing Electrolytic Copper

In one embodiment, the present invention may include a method of preparing electrolytic copper. The method may include at least the steps (A)-(C) as stated above. The method may further include any one of steps described in the section of "5. Other steps". Through these steps, Cu-leached solution with a lowered amount of Hg can be obtained. From the obtained post-leaching solution, copper ions can be selectively recovered and concentrated by Solvent Extraction (SX). Then, from the concentrated copper solution, electrolytic copper can be produced by Electrowinning (EW).

EXAMPLE

Example 1

Hg content of raw ore originating from certain mine was analyzed. As a method for analyzing content, the scale of sample was reduced, and the sample was solved into mineral acid, and then was subjected to ICP-MS. As a result of this, content of Hg was 19 ppm.

Example 2

The ore of Example 1 was used as Hg-containing primary copper sulfide ore. The ore was subjected to leaching test with use of leaching solution in which concentration of potassium iodide (KI) was approximately 130 mg/L and concentration of Fe (III) was approximately 5 g/L (FIG. 2, Iodine process). For the purpose of comparison, test in which KI was not added was also performed (FIG. 2, conventional process). As a result, at the time of the amount of leaching being 5.3 m$^3$/t, the rate of leaching Cu in iodine process was 34%, and the rate of leaching Cu in conventional process was 16%, which indicated that the rate of iodine process was higher (FIG. 2). The rate of leaching Hg at the time of the amount of leaching 4.7 m$^3$/t according to iodine process was 67%, while the rate of conventional process was 0% (FIG. 3).

Example 3

Next, the post-leaching solution that was obtained via Example 2 was recovered, and Hg content was measured. Then, the post-leaching solution was passed through column of activated carbon. After this, Hg content in the solution that had passed through the column was measured. Using the measurement, ratio of distribution for two fractions (one is the amount where the activated carbon absorbed, and the other is the amount where the activated carbon did not absorbed) was calculated. The results are shown in Table 1.

TABLE 1

| Column 210 Amount of leaching m$^3$/t | Ratio of Hg trapped by activated carbon Hg % | Ratio of Hg passing through activated carbon Hg % |
|---|---|---|
| 2.3 | 95.9 | 4.1 |
| 2.8 | 96.0 | 4.0 |
| 3.5 | 97.3 | 2.7 |
| 4.3 | 97.5 | 2.5 |
| 4.7 | 97.5 | 2.5 |

95% or more of Hg in post-leaching solution was found to be distributed into the fraction of activated carbon.

Example 4

Next, 5 L of sulfurous acid solution (the concentration being 1.5 g/L in view of SO$_2$) was passed through the column of activated carbon. Then, the solution that passed through the column was recovered to measure Hg concentration. The result is shown in FIG. 4. The "Passed solution" represents an amount of Hg that was contained in the post-leaching solution prior to passing through the column of activated carbon. "AC-trapped" (Activated Carbon-trapped) represents an amount of Hg that was absorbed into activated carbon when post-leaching solution was passed through the column of activated carbon. "Post-AC solution" represents an amount of Hg that was contained in the post-leaching solution that had been passed through the column of activated carbon. "AC-eluted solution" represents an amount of Hg in sulfurous acid solution that had been passed through the column.

As shown in FIG. 4, almost all of Hg in post-leaching solution was absorbed into activated carbon, while Hg was not eluted from activated carbon even after sulfurous acid solution was passed through the column.

The term "or" described herein intends to include the case where either of listed elements is met, and the case where all of the listed elements are met. For example, "A or B" intends the case where A is met and B is not met, the case where B is met and A is not met, and the case where A is met and B is met.

The detailed embodiments of the present invention have been described. The above embodiments are merely example for the present invention, and the present invention is not limited to the above embodiments. For example, a technical feature disclosed in one embodiment may be applied to another embodiment. Furthermore, regarding to a method or process, the order of some steps may be switched from other steps. Also, a further step may be inserted among certain two steps. The scope of the present invention is defined by the appended claim.

The invention claimed is:

1. A method for recovering Cu from copper ore, the method comprising:
   (A) providing copper ore containing 0.2 ppm or more of Hg;
   (B) treating the copper ore to leach Cu in the ore, and to leach Hg in the ore, by using a solution containing iodide ions and Fe (3+) to produce a post-leaching solution containing iodide ions, Fe (2+), Cu ions, and Hg (2+), wherein a pH of the solution is 2.5 or less;
   (C) treating the post-leaching solution with activated carbon to absorb the iodide ions and to absorb Hg (2+) in the post-leaching solution;
   (D) treating the activated carbon with sulfurous acid and/or salt thereof to release the iodide ions, not Hg (2+), for reusing the released iodide ions for the step (B); and
   (E) reusing the activated carbon that has been treated with sulfurous acid and/or salt thereof for the step (C),
   wherein the step (B) of treating the copper ore to leach Cu in the ore and to leach Hg in the ore includes treating by using a solution consisting of:
      at least one of a source of Fe (III) ions selected from the group consisting of iron (III) sulfate, iron (II) chloride to be oxidized, and iron (II) sulfate to be oxidized;
      at least one of a source of iodide ions selected from the group consisting of sodium iodide, potassium iodide, ammonium iodide, hydrogen iodide and I$_2$; and
      sulfuric acid, and
   wherein the method further comprises disposing Hg (2+) absorbed in the step (C) from the activated carbon.

2. A method of preparing electrolytic copper comprising:
   obtaining the post-leaching solution containing Cu ions according to claim 1;
   recovering copper ions from the post leaching solution via solvent extraction, and
   producing electrolytic copper from the recovered copper ions by electrowinning.

* * * * *